Figure 15:
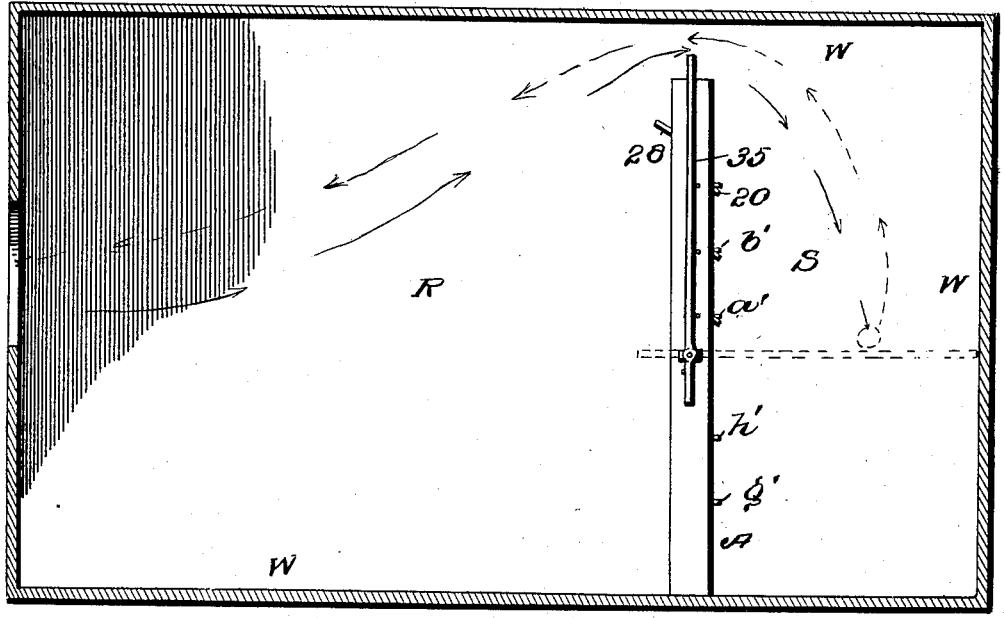

C. H. OCUMPAUGH.
VOTING MACHINE.
APPLICATION FILED MAY 11, 1897.
1,013,680.
Patented Jan. 2, 1912.
6 SHEETS—SHEET 1.
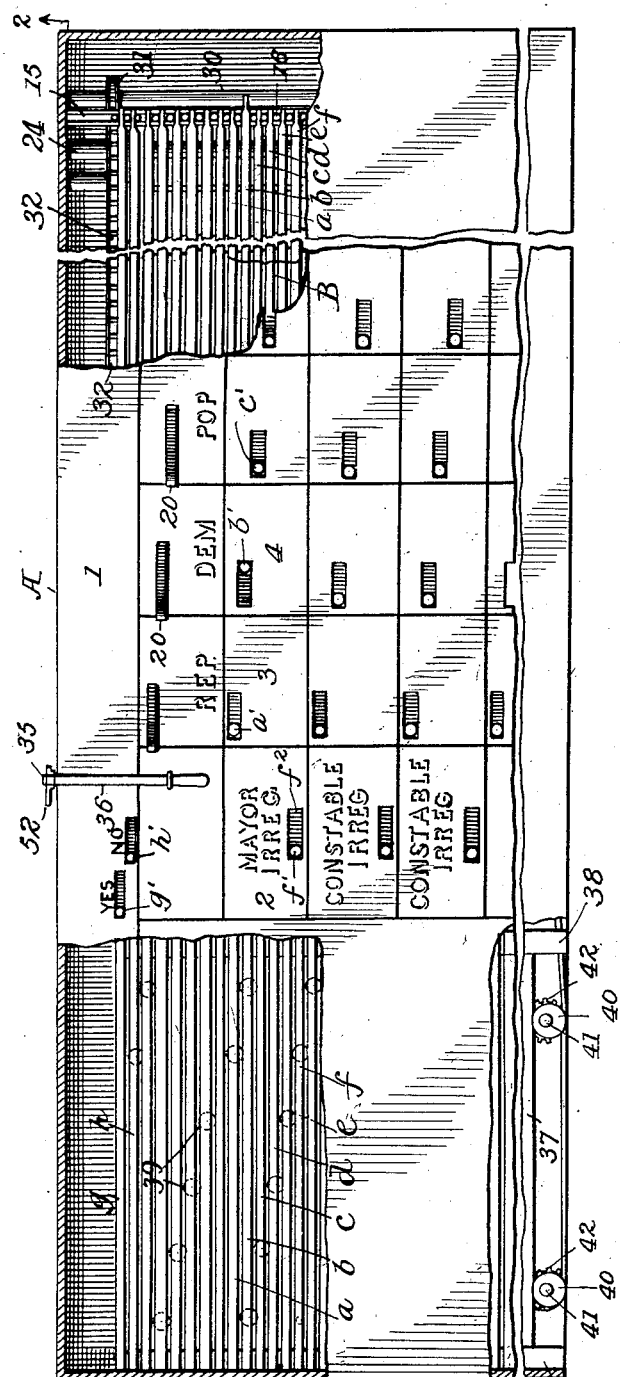
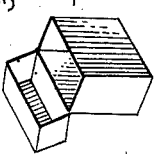
Witnesses
K. Kipp.
William E. Neff.
Inventor
C. H. Ocumpaugh
Watson & Watson
Attorneys
COLUMBIA PLANOGRAPH CO., WASHINGTON, D. C.

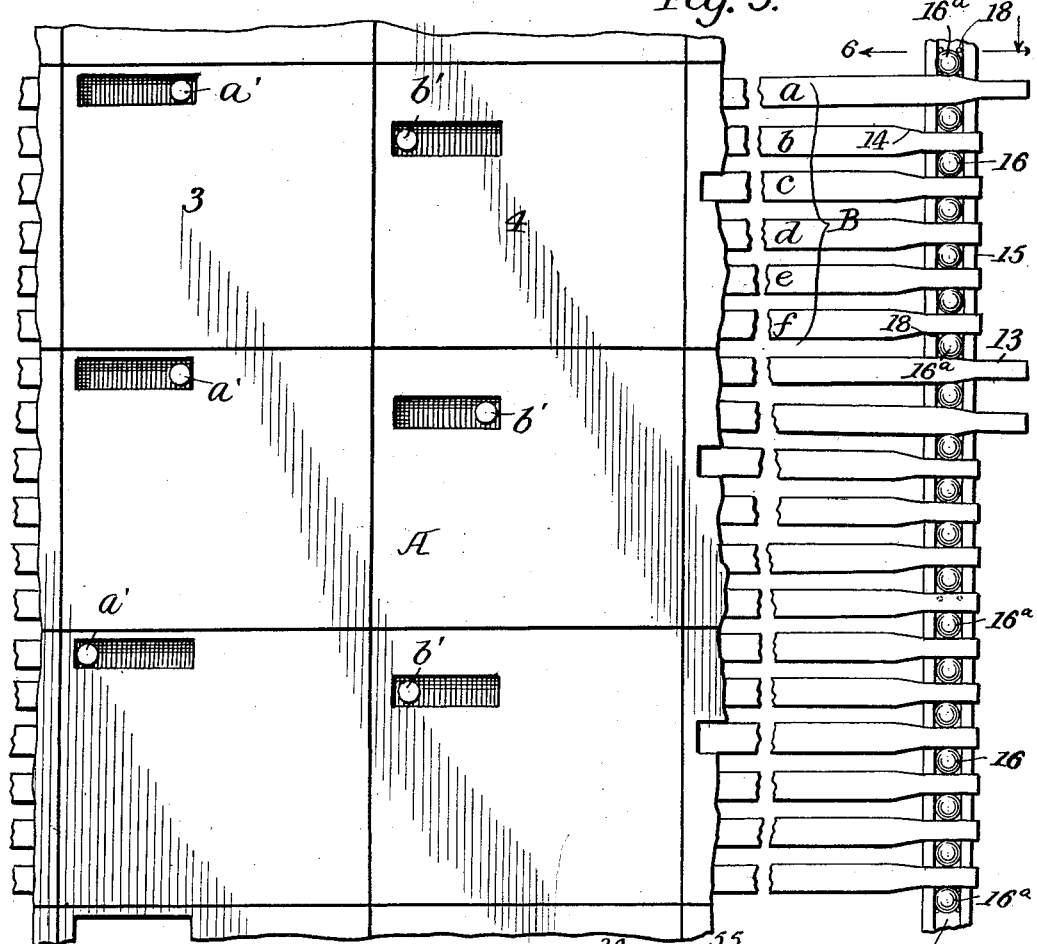

C. H. OCUMPAUGH.
VOTING MACHINE.
APPLICATION FILED MAY 11, 1897.
1,013,680.
Patented Jan. 2, 1912.
6 SHEETS—SHEET 3.
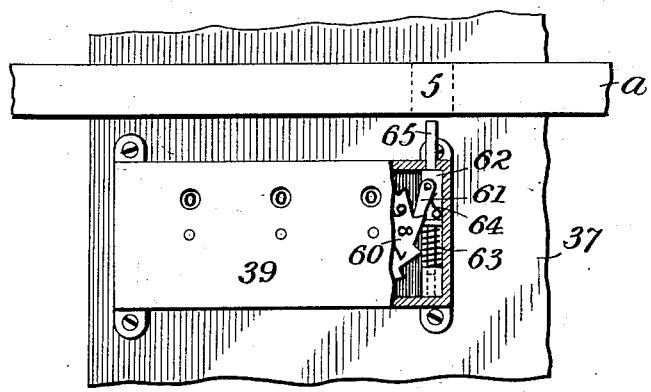
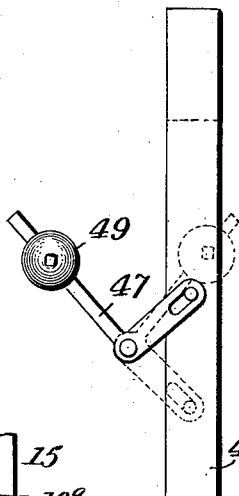
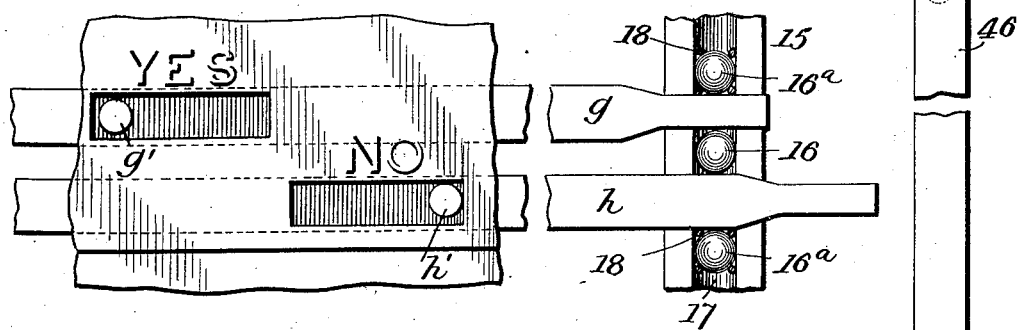
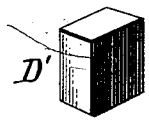
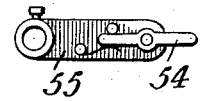

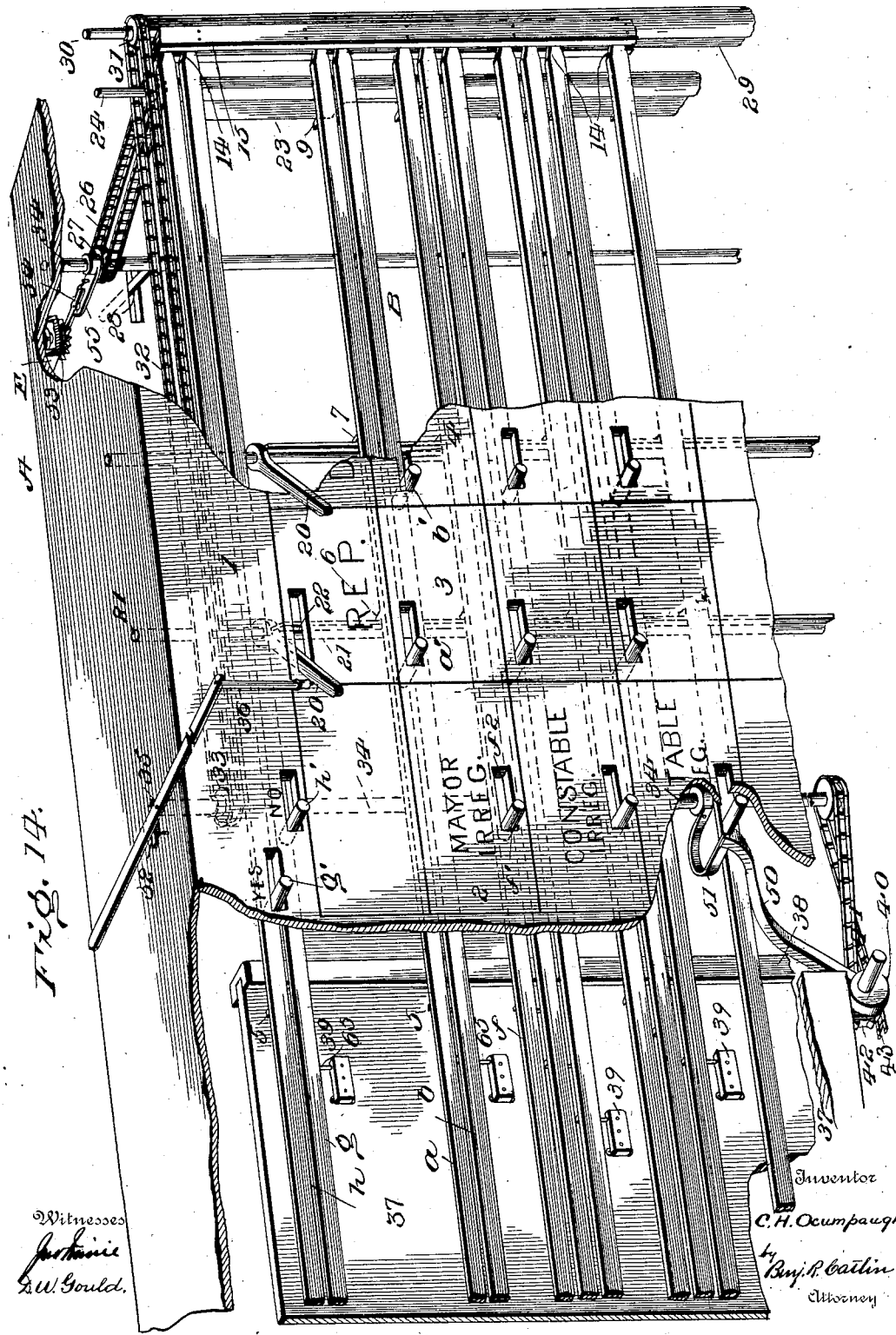

C. H. OCUMPAUGH.
VOTING MACHINE.
APPLICATION FILED MAY 11, 1897.

1,013,680.

Patented Jan. 2, 1912.
6 SHEETS—SHEET 5.

Witnesses
David W. Gould.
Harry L. Gould.

Inventor
C. H. Ocumpaugh
by
Benj. R. Catlin Attorney

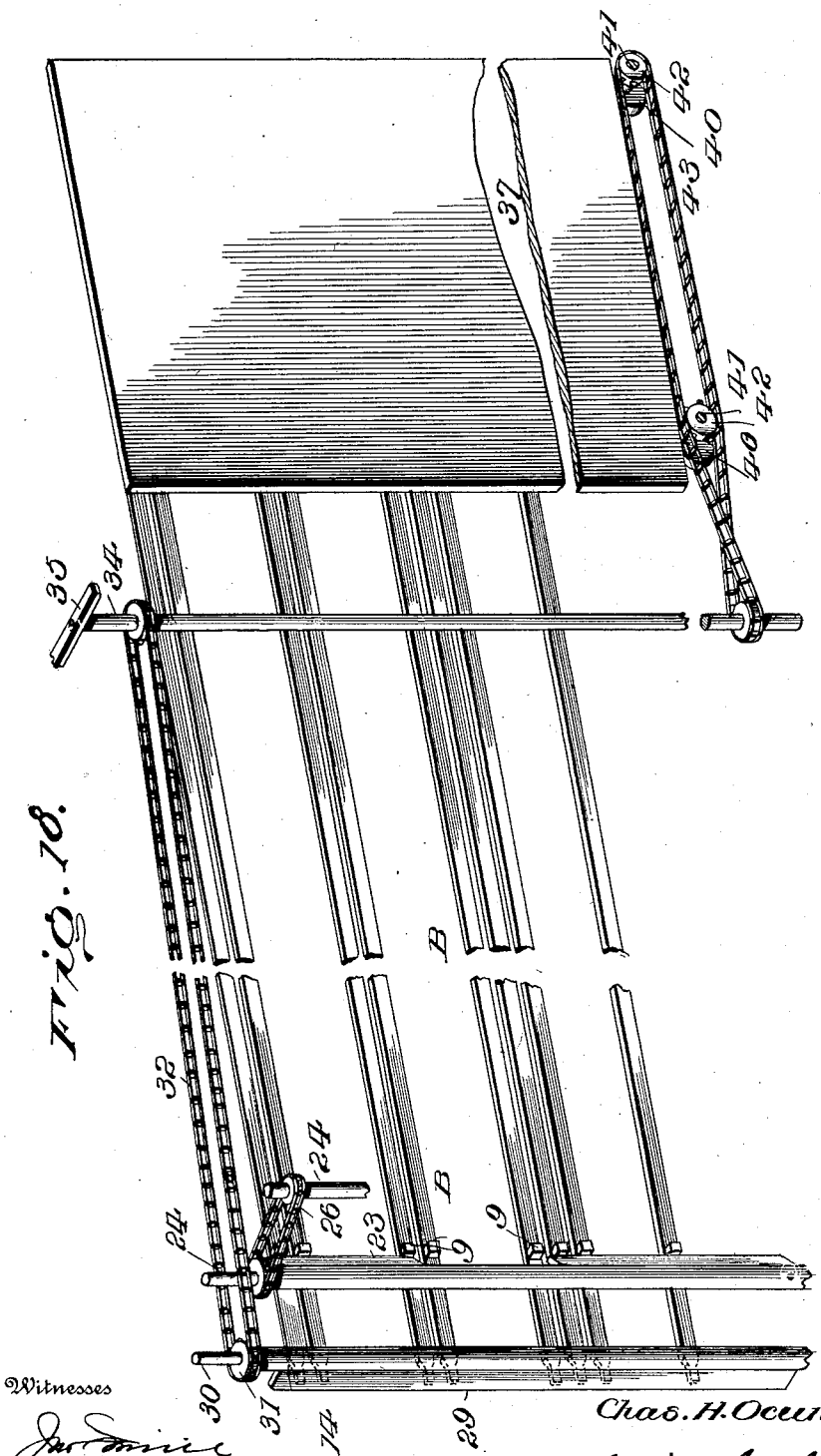

UNITED STATES PATENT OFFICE.

CHARLES HERBERT OCUMPAUGH, OF ROCHESTER, NEW YORK.

VOTING-MACHINE.

1,013,680.  Specification of Letters Patent.  Patented Jan. 2, 1912.

Application filed May 11, 1897. Serial No. 636,095.

*To all whom it may concern:*

Be it known that I, CHARLES H. OCUM-PAUGH, a citizen of the United States, residing at Rochester, in the county of Monroe and State of New York, have invented certain new and useful Improvements in Voting-Machines, of which the following is a specification.

In my improved voting machine I employ a series of sets of slide bars, one set of bars for each office to be filled and as many bars in the set as there are possible candidates for the office. Thus, for instance, there may be ten sets of bars, which would permit of voting for ten candidates, and if there were four regular parties I would provide five slide bars in each set, one bar being used for each party and an extra bar for irregular voting, as will be explained hereinafter. The slide bars for each set are preferably interlocked so that but one bar may be moved and one candidate voted for for each office. The bars are provided with handles, by means of which they are moved by the voter to set them in the voting position and they are also provided with teeth which operate upon registers when the bars are in the voting position. The registers are carried in a movable frame. Means are also provided for throwing any of the bars, or sets of bars, out of action to prevent voters from voting illegally for candidates for whom they are disqualified to vote, for instance, to prevent women from voting for other officers when they are only permitted by law to vote for school commissioners. Means are also provided for enabling a voter to vote for any two persons nominated when two offices of the same kind are to be filled. This is accomplished by throwing two sets of interlocking devices into one so that two rods (representing candidates) may be moved in the same set if desired. Means are also provided to enable voters to vote for candidates not on the regular ticket and various devices are added to render the machine complete and provide against fraudulent voting and miscounting of the results. Certain slide bars and registering devices are provided for registering the total number of straight-tickets voted and also for voting " yes " and " no " on questions submitted to the people which can be answered in the affirmative or negative. A registering device is also provided which keeps the record of the entire number of votes cast, said record being visible from the exterior of the case.

Figure 16:
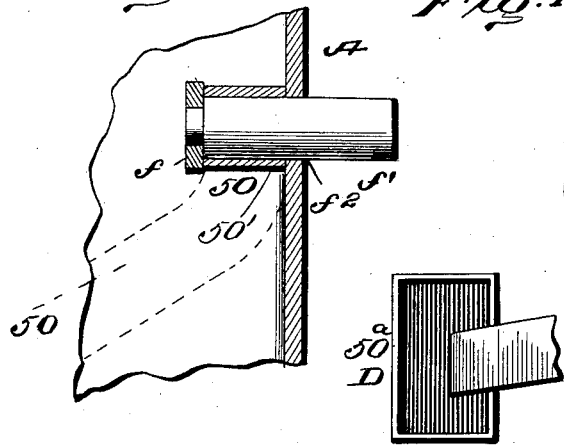
Figure 17:
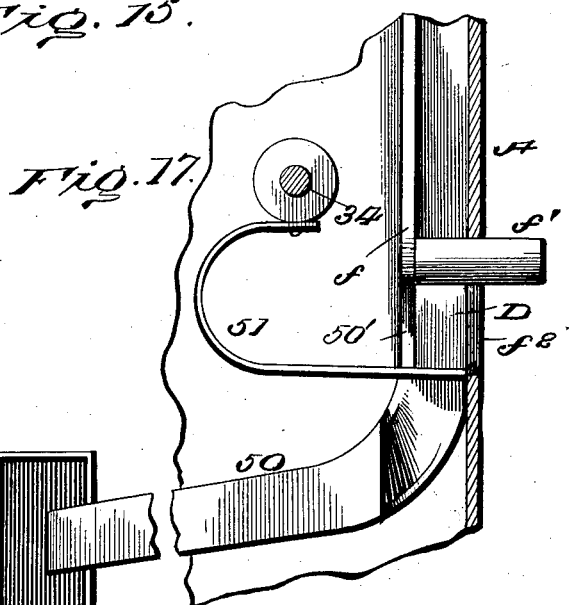

In the accompanying drawing in which like reference letters indicate the same parts throughout the several views: Figure 1 is a front view of my improved voting machine, the parts being broken away to expose the interior. Fig. 2 is a plan view of the same, the top of the casing being removed. Fig. 3 is an enlarged view of a portion of Fig. 1. Fig. 4 is a left end view, the end of the casing being removed. Fig. 5 is a similar view of the right end of the machine. Fig. 6 is a section on the line 6—6 of Fig. 3. Fig. 7 is a perspective view of a small box which may be used to inclose irregular votes written on slips of paper. Fig. 8 is a perspective view of a block upon which the irregular votes can be written. Fig. 9 shows one of the counters connected to the register rack. Fig. 10 illustrates in detail the interlocking device for the slides for voting in the affirmative or negative. Fig. 11 is an enlarged view of the blade for locking out certain candidates, and Fig. 12 illustrates a modified slide bar. Fig. 13 is a plan of an arm carrying a pawl to actuate a total-vote register. Fig. 14 is a broken partial perspective of the machine. Fig. 15 is a partial plan of diagrammatic character illustrating a particular situation of the voting machine in a room; Fig. 16 is an enlarged partial section on line 16—16 of Fig. 2, the conduit-closing arm being partly broken away; and Fig. 17 is a similar view showing a vote receptacle fully entered and in readiness to be pushed into its chute by a slide bar when reset. Fig. 18 is a perspective view of vote indicator resetting devices and register operating devices, the view being opposite to Fig. 14.

Referring to the drawings, A indicates a suitable rectangular frame or casing within which nearly all of the mechanism is inclosed. The casing has a front plate 1, the middle of which constitutes the name-plate, which is divided into vertical and horizontal sections. As shown, the offices to be filled are designated on the sections of the left hand tier or row; the Republican candidates are posted on the sections 3 of the next tier or row, the Democratic candidates on the sections 4 of the next row, etc. In the rear of the front plate 1 and extending nearly from end to end of the casing are a series of sets of sliding bars. There should be as many sets of bars as there are horizontal rows of divisions on the name plate and as many bars in a set as there are vertical rows of divisions. In other words, there is a bar for each section or card on the name plate. For instance, for the next to the top row there is a set of bars B consisting of individual bars $a$, $b$, $c$, $d$, $e$, $f$. The bar $f$ has a handle $f'$, extending through an opening in the left hand section, the bar $a$ has a similar handle $a'$ extending through an opening in the next section to the right, and so on, each bar being provided with a handle extending through its appropriate section. The voting is done by moving the selected handles from the left end of the openings to the right end, as will be explained later. By this construction the bars or slides are more directly moved than in prior machines, the handles to be manipulated being attached directly to the slides. A further advantage of great practical importance is that every handle corresponding to a vote is moved out of the line of handles when the selection is made and the slide operated. This lateral situation of the selected and manipulated handles with respect to the others remaining in the row makes them particularly conspicuous thereby avoiding the difficulty of instantaneously and accurately perceiving what parts have been moved as happens in the case of push buttons. This is of special importance in view of the fact that the perceptions of many voters are impaired or defective by reason of age or other causes. The whole forward movement of the slide and the consequent locking of the other slides is directly effected by the voter who thereby selects his candidate. The selected slide can be returned by its handle and another slide moved at any time while the voter is in the booth, since no registry is made before he leaves the booth. The handle is therefore not only moved laterally out of the handle row, but is moved to the end of its path and has therefore its maximum separation from the row during the time the voter is selecting his candidates and changing or correcting his selections if he desires. Each of the bars is provided with a rearwardly extending tooth 5 in the registry chamber and also with other similar teeth 6, 7, 8 and 9. At their middle and their left hand ends the bars are sustained in suitable bearings 11, 12. At their right ends the bars are formed with rectangular extensions 13 and the offsets 14 between the bodies of the bars and the extensions are tapered or wedge-shaped. The reduced portions 13 rest normally between two vertical guide strips 15 and they are separated by balls 16 which are sustained in semi-circular guide grooves 17. The balls $16^a$ which separate the sets of rods from each other are held from longitudinal movement in grooves 17 by cotter pins 18 or other suitable fastening devices, said devices being so arranged that these balls can be released if desired. In the instance shown a ball can be released by withdrawing the four cotter pins which confine it. In the ball channel between two of the balls $16^a$ there is sufficient "slack" to permit of one of the slide bars being pushed to the right until its body portion separates the balls, the inclines 14 forcing the balls up and down away from it. This operation locks all of the other slide bars in the set against longitudinal movement and thus the voter is prevented from voting for two or more persons for the same office. If, however, it is desirable that a voter should be permitted to vote for two names in one section, as is sometimes the case, this may be accomplished by liberating the confined ball $16^a$ at the upper or lower side of the section. For instance, as shown in Fig. 3, two constables are to be voted for and some voters may desire to select both names from one section. The cotter pins of the ball $16^a$ between the two sections are therefore removed and the ball freed. It will be evident that any two slide bars in the two sections can now be moved to the right as the slack in the two sections is combined. I have thus provided an interlocking device which normally limits the voter to one vote for each office to be filled, but which can be so arranged as to permit him to vote for a predetermined number of candidates for the same office, termed "multi-candidate voting" if desired.

At the head of each party column there is an opening 19 through which projects a lever 20 which is mounted on a shaft 21. The shaft 21 carries a radial blade 22. When the lever 20 is in its normal position the blade 22 stands in the left of a vertical row of teeth on the rear of certain of the slide bars. Thus, as shown, the blade 22 of the lever 20 of the Republican column stands at the left of the teeth 6, which teeth are on the slide bars connected with the handles $a'$ in the Republican column. By moving the lever 20 to the right the shaft 21 is turned and all of the slide bars representing the Republican candidates are moved to the right, thus setting the machine for a straight Republican ticket. If it is not desired to vote a straight Republican ticket the straight ticket bars may be moved to the right in a body, as above described, and afterward those not wanted can be moved to the left, this operation throwing lever 20 to its normal position and candidates from other parties can be selected in their places. Where the ticket to be voted is scattered over the parties the candidates may be selected singly by moving the handles of their respective slide bars to the right. It will be noted that although the bars interlock there is nothing to prevent a bar from being withdrawn and another one substituted and hence the voter is at liberty to make any changes he sees fit before leaving the machine.

It is sometimes desirable to limit the number of officials which a certain class of voters may vote for, thus, for instance, in certain localities women are allowed to vote for certain officials and not allowed to vote for others. This limitation is accomplished by locking the slide bars corresponding to the offices not to be voted for in their left hand position. For this purpose I have shown teeth 9 on the rear of the rods and a radial blade 23 upon a vertical shaft 24. This shaft is operated by a sprocket wheel 25, chain 26, sprocket wheel 27 and lever 28 projecting from the rear of the box. When a limited voter enters the booth the officer in charge of the voting machine turns the lever 28 and throws the stop arm 23 into the path of the teeth 9 of the slide bars which are to be locked, thus preventing such bars from being moved. The teeth 9 may be omitted from the bars which do not require locking, or all of the bars may be provided with teeth and the blade 23 may be cut away in part as shown in Fig. 11, so as not to engage with the bars which are not to be locked.

The resetting mechanism includes a blade 29 radially arranged on a vertical shaft 30. While the slide bars are being set the blade 29 stands in its normal position away from the ends of the slide bars and at a sufficient distance to allow any of the bars to be set for voting. After the vote is registered the shaft 30 is rocked and the blade 29 is moved against the ends of the slide bars, thus forcing all of the bars which have been set into their left hand or normal positions. Before another vote is taken the shaft is rocked in the other direction and the blade 29 returned to its normal position. The shaft 30 is provided with a sprocket wheel 31 which is connected by a chain belt 32 with a sprocket wheel 33 upon a vertical shaft 34 which is preferably located near the middle of the casing. Upon the upper end of the shaft 34 is a horizontal lever 35 which has a jointed extension 36. This lever is operated by the voter who comes into the booth at the rear of the box, grasps the end of the lever and walks around the left end of the box carrying the lever with him until he reaches the name-plate in front, when he releases the lever and is ready to arrange his vote. This operation rocks the shaft 34 approximately 90°. By the medium of the wheel 33 and chain 32 it also rocks the shaft 30 and moves the blade 29 away from the ends of the slide bars. The shaft 34 is in operation rocked back and forth through part of a circle only thereby allowing the case or box to be set against a wall to prevent passing about it. It also provides that a fixed stop may be used requiring no manipulation. After the vote is arranged the voter again grasps the lever and walks around the left end of the box to the rear, rocking the shaft 34 back approximately 90° and moving the resetting blade 29 against the end of the slide bars to reset them. The lever is stopped in one or both directions by a cleat 52 or the like. In thus resetting the bars, including bar $f$, an irregular vote-receiving opening $f^2$ is closed and the shaft 34 also moves an arm 51 to close a vote receiving chute 50 as hereinafter described. The exact distance through which the shaft 34 is rocked is not essential however it being only necessary to provide sufficient movement for the purposes and functions herein set forth and any variation consistent with such functions will be within the invention.

The construction provides that the machine can be placed with one end against a wall without interfering with its operations, as best shown in Fig. 15, in which W denotes the walls of a room, A being the machine casing. The space denoted by S between the front of the casing and the adjacent wall serves as a booth, the space R indicating that part of the room behind the machine and separated from the booth by the machine casing.

The initial situation of a resetting lever 35 is shown in full lines. In entering the booth the voter moves the lever to the situation indicated by a dotted line and resets the voting mechanism. In leaving the booth he returns the lever and thereby registers the vote cast in the meantime. If the voter does not seasonably leave the booth, the lever 35 may be moved to its initial situation by an authorized officer actuating the same from the rear of the casing a lever extension 56 being in the present instance indicated for the purpose. This operation would register any vote made by the voter who could then be ejected without actuating any mechanism. The general construction is economical since it dispenses with the necessity of a special booth to inclose the machine.

The registering mechanism is arranged in the left end portion of the casing. Each slide bar has a single tooth or projection 5 which is moved into the path of one of the counters of the registering device when the bar is moved to the right, said tooth being normally inoperative upon the counter.

There is a counting or registering device for each candidate, said devices being connected to the plate or rack 37 which slides in grooves in vertical guides 38. The counting devices 39 may be of any approved construction and it is not considered necessary to describe them in detail. They are affixed to the plate or rack 37 and when the plate is raised the counters are operated by the teeth 5 of the bars which have been selected. The registry plate 37 is raised as each voter leaves the booth, thus registering his vote and it is lowered as the succeeding voter enters the booth. This movement may be accomplished in various ways. As shown, the plate rests on two eccentrics 40 which are mounted on horizontal shafts 41. Upon the shafts 41 are sprocket wheels 42 which are operated by a chain 43 passing around the sprocket wheel upon the lower end of the shaft 34. It is preferred to arrange the registers and register operating mechanism so that the registers shall be supported in vertical columns and in stepped lines for economy of space and to avoid the danger of misplacement incidental to prior horizontal arrangement of the several registers.

I provide a slide bar in each set for irregular voting. As shown, these slide bars are marked $f$ and they are provided with handles $f'$ extending through openings $f^2$ in the left hand tier of sections on the name-plate. This handle $f'$ is placed at the end of bar $f$ to permit insertion of an irregular vote and no extension of said bar to the vicinity of the registers is required for the reason that irregular votes are counted in ordinary manner as will be understood from the description following. When a candidate desires to vote for some one not on the regular ticket the name is written or printed on a suitable piece of paper and inclosed in a box D, such as that shown in Fig. 7, or it is written on a block or box D', as shown in Fig. 8. The irregular slide bar $f$ is then moved to the right and the block or box is passed into the opening $f^2$ at the left of the handle $f'$. From the left of each of the openings $f^2$ a channel or chute 50 leads to a receptacle 50$^a$ for the boxes D or blocks D'. The upper ends of these chutes are closed while the voter is in front of the machine by the ends of arms 51 which are carried by the shaft 34, which arms act as stops to prevent the untimely introduction of another vote.

The operation of voting an irregular ticket is as follows: The slide $f$ is moved to the right by the handle $f'$ and the ticket box or block is passed into the opening at the left of the handle $f'$. As the voter leaves the booth and rocks the shaft 34 the arms 51 are first withdrawn, the register rack is then raised and the irregular vote counted and finally the resetting blade pushes the bar $f$ to the left and forces the box or block into the chute 50. As the next voter enters the box the arms 51 again swing around to close the conduits 50. In this manner it is only possible for a voter to cast one irregular vote for each office as there is only room for one irregular block or box in the opening at one time, and only one name should be on a block or in a box. Any block or box having more than one name will be thrown out and not counted. The chute 50 (see Fig. 17) is closed by arm 51 until the bar or slide $f$ is reset with the effect to push the vote into the chute, said arm being suitably withdrawn as elsewhere stated. As shown in said figure the irregular slide bar which terminates the handle $f'$ has been moved to the locking position and the vote receptacle D inserted upon a part 50' of the chute. After said handle, which virtually constitutes a part of the bar, has pushed the vote receptacle D into the chute it, the bar handle, constitutes a closure or cover for the mouth of said chute. Although but a single receptacle 50 with corresponding chute or conduit and conduit stopping arm is shown it will be understood that the number in practice will equal the number of irregular nominees. Before leaving the box the voter can change his irregular vote without any indication by the registering devices by simply removing the block-like vote or vote-carrier and substituting another, or he may then vote for any regular candidate and be so registered when he leaves the voting box or booth. It is obvious that the distance through which the arms 51 are moved might be varied, the operating gear being suitably modified, and further, that the principle would remain the same whether one or more chutes were closed by an arm.

Upon the top of the case is a T-shaped cleat 52 which prevents the lever 35 from being moved too far in either direction. At any convenient place on the casing I locate a device for registering the total number of voters. Thus, as shown in the drawing, there is a register E attached to the rear of the casing. (See Figs. 5 and 14.) This register is operated by a star wheel 53 which is engaged by a pawl 54 which is carried by an arm 55 of the shaft 34. Each time the shaft is rocked the register E counts one. As the shaft is moved in the opposite direction the pawl 54 yields and passes the star wheel without moving it. The dials of the register E may be visible from the rear of the casing.

When a person remains too long in a booth for any reason and it is necessary to eject him the officer in charge inserts a rod 56 (shown in dotted lines in Fig. 5) into a socket in the rear end of lever 35 and walks around the right end of the machine, thus moving the lever 35 in the direction in which it should be moved by the voter. The officer in thus entering the booth registers the voter's vote, in so far as he has arranged it, before coming in front of the machine, thus preserving the secrecy of the ballot. The officer then withdraws the arm or rod 56 and ejects the voter.

For convenience of description I have used the terms vertical, horizontal, right, left, etc. It should be understood, however, that my invention is not limited to the particular arrangement and direction of movement specified. For instance, the slide bars might be vertical instead of horizontal, in which case I prefer to provide them with counter-weights, as shown in Fig. 12. In this figure the bar 46 is connected to an elbow lever 47 pivoted at 48 and provided with a weight 49 on its upper branch. When the bar is down the weight is tipped to the right of the pivot and tends to hold the bar down. When the bar is raised the weight is tipped to the left of the pivot and holds the bar up. Vertical bars so constructed can be adjusted in the same manner as the horizontal bars. When vertical bars are used it is preferable to move the plate carrying the registers in a horizontal direction.

Any suitable register devices or counters may be used on the register rack, there being one counter to each slide bar, and one tooth on each slide bar for engagement with the counter. In Fig. 9 I have shown an enlarged view of a portion of the rack and one of the counters. This counter is arranged to register up to 999. As shown, the unit wheel 60 is a ratchet wheel having ten teeth which are engaged by a pawl 61 upon the counting slide 62. This counting slide is sustained in its upper position by a spring 63 and the pawl is normally pressed into engagement with the ratchet wheel by a smaller spring 64. The slide has a stem 65 which engages the tooth 5 in its appropriate slide bar when the bar is set for voting. When the bar is in its normal position the rod 65 passes the tooth and the counter is not operated.

In Figs. 1 and 10 I have show two bars, g, h, which I use respectively to vote "yes" and "no" upon questions which may be answered in the affirmative or negative. These bars are provided with an interlocking device similar to that above described for the other bars. As shown, in Fig. 10, there is a loose ball 16 between the two bars g, h, and there is only sufficient slack to permit one of the bars to be operated at a time. Above and below the bars are cotter pins 18 which limit the vertical movement of the bars g and h. As illustrated in Fig. 1, the slide bars g, h, are at the top. Below these bars is a group C of six bars which are used to register the total number of straight tickets voted for each party, These bars are provided with levers or handles, and are also respectively provided with teeth 6, 7, 8, and each time a straight ticket shaft is rocked one of the bars is thrown to the right, bringing its tooth 5 into position to operate on one of the counters on the register rack. The projections 6, 7, 8, return their respective straight ticket shafts to their normal positions when the slide bars are returned to their normal positions.

On Fig. 1 the counters on the register rack are indicated by dotted circles 39. As shown, the counters for the several parties are arranged in vertical rows and the different counters for each office are in an inclined row extending from the left to the right of the rack.

The foregoing specification and the drawing describe and illustrate one embodiment of my invention. It will be understood, however, that I do not limit myself to the precise construction and arrangement of parts shown, as the apparatus may be variously modified without departing from the spirit and scope of my invention.

Having described my invention, what I claim and desire to secure by Letters Patent is:

1. In a voting machine, a plurality of slide bars, corresponding to candidates or the like, a register for each of the several bars, a slide bar mediately actuating each register but disconnected therefrom, said registers being arranged in vertical columns and in stepped lines lengthwise the machine, and the slide bars having register-operating teeth similarly arranged, all substantially as described, to economize space.

2. In a voting machine, the voting mechanism, the register mechanism comprising a plurality of registers arranged in vertical series and stepped lines, and means for moving the registers vertically, and a plurality of slide bars corresponding to the registers and normally in an inoperative relation to said registers, each bar having a projection normally out of coöperative relation with the register but being movable at will to carry said projection into operative relation to its corresponding register whereby when the registers are moved those corresponding to the selected bars will be operated.

3. In a voting machine, the combination of interlocking devices, slide bars corresponding to a plurality of parties, and a movable register rack, with a straight ticket rock-shaft operating in fixed bearings, said shaft when actuated moving all the slide bars of a given party engaging said interlocking devices, and said interlocking devices, the slide bars remaining free to move reversely thereby permitting individual slide bars of said party to be changed and returning of the straight ticket rock-shaft to its normal position, every other party's slide bars being thereby made free to be actuated before the voter leaves the booth.

4. In a voting machine, registering devices, a separate straight ticket mechanism for each party comprising devices to vote a straight ticket, devices to reset the straight ticket mechanism when it is desired to change and vote less than a straight ticket, partial ticket mechanism whereby less than the whole may be voted, and irregular voting mechanism, all or any of the actuated voting mechanism being changeable by the voter without registering before he leaves the booth, substantially as described.

5. In a voting machine, the combination of a series of slide bars, means for locking selected slide bars against operation without moving the bars, said means consisting of teeth on said bars, and a blade 23 adapted to interlock with the teeth on the selected bars, substantially as described.

6. In a voting machine, the combination with a series of slide bars, of means for rendering certain bars inoperative without moving them consisting of teeth on the bars, a rock shaft, and the blade on the rock shaft adapted to interlock with said teeth on the bars, substantially as described.

7. In a voting machine, the combination with the slide bars having the teeth 9, of a rock shaft 24 carrying a blade adapted to interlock with said teeth, and a handle 28 extending from the rear of the machine and adapted to operate said rock shaft, substantially as described.

8. In a voting machine, the combination of a series of slide bars, a locking shaft extending transversely of the bars, and means for operating the shaft to lock a selected part of the bars at one operation without moving any of the voting mechanism, substantially as described.

9. In a voting machine, a casing containing voting devices, a reciprocating rock shaft 34, registering mechanism, and intermediate connections whereby rocking the shaft through part of a circle resets the voting mechanism and returning the shaft registers the vote made in the meantime, said devices being operative by a reciprocating lever passing about one end only of the casing and through part of a circle only, and said reciprocating lever.

10. In a voting machine, a casing containing voting devices comprising slide bars, a reciprocating lever, registering mechanism, and intermediate connections, whereby carrying the lever in one direction registers a vote, resets the voting mechanism and locks the slide bars against action while carrying the lever in the reverse direction unlocks the slide bars.

11. In a voting machine, registering and resetting mechanism, a lever adapted to operate the registering and resetting mechanism, in combination with means for actuating the mechanism from the exterior by another if desired while the voter is in the booth, substantially as described.

12. In a voting machine, the combination of a series of slide bars and a resetting mechanism comprising a rock shaft rotatable in fixed bearings, a blade fixed on said shaft and adapted to be rotated with the shaft, and means for rocking said shaft and blade to reset the bars by rocking the blade directly against the bars.

13. In a voting machine, the combination of registering devices, a movable register rack, a group of slide bars for each office, one or more of said groups including one for an irregular candidate, each bar having independent connection with register operating devices, the irregular candidate bar being locked by a movement of the same necessary for the insertion of a ballot.

14. In a voting machine, the combination of registering devices, and multi-candidate voting mechanism, with mechanism for irregular voting, including devices which remain movable reversely after operation, whereby the voter after he has set the voting mechanism can change either the irregular or regular multi-candidate voting mechanism without registry before he leaves the booth.

15. In a voting machine, the combination of registering devices for multi-candidate regular voting mechanism, and irregular voting mechanism, each of said mechanisms when voted remaining free to be changed by the voter without registry before he leaves the front of the casing.

16. In a voting machine, the combination of interlocking slides having handles arranged in a row, said handles being movable laterally with respect to the row to move the corresponding slide and lock the others in selecting a candidate or the like, the casing having a wall provided with slots to limit the movement of the handles and their slides, and independently operated registering mechanism, whereby the selected handle or handles are conspicuously separated and others locked without registering the vote.

17. In a voting machine, the combination of a plurality of voting mechanisms adapted to be placed in voted condition without registering, interlocking slides, one for each registering mechanism, handles for moving the slides arranged in a row, each handle being movable laterally with respect to the row to move the corresponding slide to voted position and lock the other slides of the row in selecting a candidate or the like, movement of each handle laterally conspicuously separating it from its row.

18. In a voting machine, the combination of registering devices, a movable register rack, a group of slide bars for each office, one or more of said groups including one for an irregular candidate, each bar having independent connection with register-operating devices.

19. In a voting machine, the combination of interlocking slides having handles arranged in a row, said handles being movable laterally with respect to the row to move the corresponding slide and lock the others in selecting a candidate or the like, and independently operated registering mechanism, the selected handle or handles being conspicuously separated from its row when moved and locking other handles without registering a vote.

20. In a voting machine, the combination with a support having a ballot receiver therein, a series of movable ballot indicators having straps provided with enlargements, a series of registers arranged to be operated by the indicators, a ballot depositing device embodying a cover for the receiver and operated directly by the voter to deposit a prepared ballot and cover the aperture, a strap connected to the depositing device having an enlargement thereon, stops coöperating with the enlargements on all the straps to permit the operation of a single strap, and a resetting device for returning the indicators and ballot depositing device to normal position.

In testimony whereof I affix my signature, in presence of two witnesses.

CHARLES HERBERT OCUMPAUGH.

Witnesses:
E. C. HEMPEL,
C. HERBERT CLARK.

Copies of this patent may be obtained for five cents each, by addressing the "Commissioner of Patents, Washington, D. C."